Jan. 12, 1960   L. F. RICHARDS   2,920,491
V-BELT SHEAVE CONSTRUCTIONS
Filed Jan. 30, 1958

INVENTOR.
LARRY F. RICHARDS
BY
ATTORNEY

United States Patent Office 2,920,491
Patented Jan. 12, 1960

2,920,491

V-BELT SHEAVE CONSTRUCTIONS

Larry F. Richards, Denver, Colo., assignor, by mesne assignments, to Dayton Tandem V-Belt Drive Co., Dayton, Ohio, a corporation of Ohio Application January 30, 1958, Serial No. 712,239

7 Claims. (Cl. 74—230.01)

This invention relates to a V-belt sheave, and more particularly to a sheave of the type adapted to transmit power from the drive wheels to idler wheels of a dual wheel automotive vehicle, such as illustrated and described in prior Patent No. 2,733,612. As described in the said prior patent, such sheaves are placed upon the drive wheels at each side of a vehicle to drive similar sheaves on the idler wheels at each side of a vehicle by means of a V-type transmission belt. In actual practice it has been found exceedingly difficult to employ V-belts and V-belt sheaves for this particular use, due to the fact that ice, snow, mud, sand, etc. will build up in the belt grooves of the sheaves so as to increase the tension in, and cause rapid destruction of, the belts. Attempts have been made to alleviate this difficulty by placing refuse exit openings in the sides and bottom of the V-belt groove. These attempts have not been successful, since, in freezing weather, ice will accumulate between the openings, creating an irregular and bumpy track in the groove, which will quickly disintegrate the belt. The principal object of this invention is to provide means for completely eliminating the accumulation of ice, snow, sand, and other debris at any point in the V-belt grooves of vehicle V-belt drives.

Another difficulty encountered with V-belt vehicle drives results from the extreme difficulty of placing the V-belts in position in the sheaves, due to the immovable center-to-center distance between the sheaves. Another object of this invention is to provide means for quickly and easily placing the V-belt in position without it being necessary to remove the sheaves.

The belt grooves of V-belt sheaves for vehicle drive use are subjected to excessive wear due to abrasive gravel, road sands, dust, etc., and when worn beyond a usable point, it is necessary to remove and discard the entire sheave. Since such sheaves are exceedingly large and heavy, the cost of replacement is excessive. A further object of this invention is to provide a sheave in which the sides of the belt groove which are subjected to wear can be quickly and easily replaced without it being necessary to discard or even remove the remainder of the sheave.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

Figure 1:
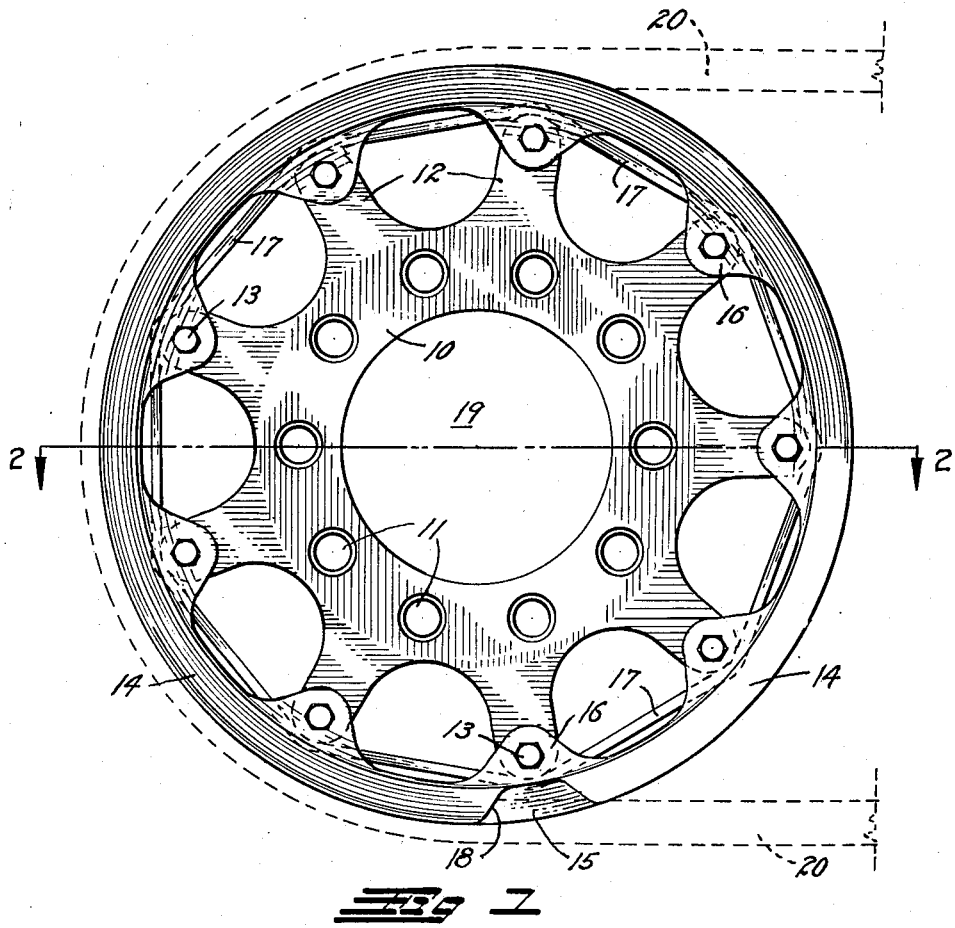
Fig. 1 is a side view of the improved V-belt sheave.
Figure 2:
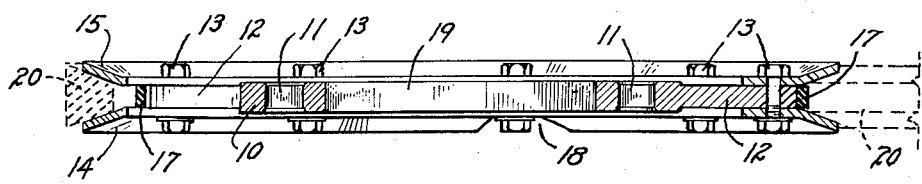
Fig. 2 is a horizontal section therethrough, taken on the line 2—2, Fig. 1.

The improved sheave comprises a wheel disc 10 provided with a relatively large axial opening 19 and with an annular series of wheel lug openings 11 of a size and spacing to correspond to the size and spacing of the wheel lugs of an automotive vehicle of the heavy dual-wheel type. A plurality of relatively flat, radial, spaced-apart spokes 12 are cast integrally with, or otherwise formed on, the wheel disc 10. The spokes 12 lie in the plane of the disc 10 and are preferably of less thickness than the disc. The spokes 12 terminate in rounded extremities, as illustrated in broken line in Fig. 1, which are drilled to receive an annular series of clamp bolts 13. The clamp bolts 13 secure two spaced-apart, outwardly flaring, circular rim rings 14 and 15 to the extremities of the spokes to form a V-belt groove thereabout. Each rim ring is formed with a plurality of inwardly extending bolt ears 16 spaced to correspond to the spacing of the spokes 12. The bolt ears 16 of the opposite rim rings 14 and 15 are clamped to the opposite faces of the spokes 12 by means of the clamp bolts 13. The outer rim ring 14 is provided with an inwardly extending, belt-installing notch 18 positioned opposite one of the bolt ears 16 thereon. It will be noted that the two rim rings are spaced apart throughout their entire circumference a distance equal to the thickness of the spokes. It will also be noted that the oppositely flaring rim rings form a V-belt groove for retaining a V-belt, such as indicated in broken line at 20, in place.

An endless, flexible, rubber de-icing band 17, having a width substantially equal to the thickness of the spokes, is tensioned about the extremities of the plurality of spokes 12 so as to extend tangentially between the spoke extremities throughout the entire circumference of the sheave. The band 17 is formed from exceedingly tough, elastic, wear-resisting rubber, and is initially formed of a diameter of less than the diameter of the periphery of the series of spokes, so that it must be tensioned in order to place it in position, and so that it will remain under inherent tension about the periphery of the series of spokes when in place. The band 17 may be placed in position about the extremities of the spokes 12 before the outer rim ring is bolted in place thereon. It can, however, be placed in position by stretching it over the outer rim ring and allowing it to snap into position about the extremities of the spokes.

A V-belt transmission employing the improved sheaves is installed on an automotive vehicle by removing the four outer dual wheels therefrom and placing one of the improved sheaves over each extremity of the drive axle of the vehicle, and one of the improved sheaves over each extremity of the idler wheel axle against the inner dual wheels, with the wheel lugs extending through the openings 11 in the sheaves. The V-velts 20 are then placed about the sheaves on the idler wheels and the outer dual idler wheels are bolts in place with the idler sheaves therebetween, by means of the usual lug bolts passed through the lug bolt openings 11. The V-belts are then trained partially about the drive sheaves and through the installing notches 18 thereon. The vehicle is then put in motion so that the belts will be drawn by the notches 18 into the V-belt grooves of the drive sheaves. The outer drive dual wheels are then bolted in place against the drive sheaves. Since the rim rings on each sheave are spaced apart the thickness of the spokes 12, ice, snow, and other debris will be forced inwardly between the rim rings and into the open spaces between the spokes 12, from whence it will fall to the road.

The resilient de-icing band 17 is in a state of constant vibration while the vehicle is in motion, due both to road shocks and to centrifugal force tending to throw the straight tangential portions thereof outwardly. This constant vibration prevents accumulation and adherence of ice and snow between the rim rings 14 and 15. The band also prevents ice from freezing to and accumulating on the extremities of the spokes, since it prevents moisture contact with spoke extremities; and since it is in constant movement over these extremities due to the constant vibration and constant flexing under centrifugal force, all ice formation is positively prevented.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A V-belt sheave for vehicular use comprising: a wheel portion; means for securing said wheel portion to the wheel of a vehicle; spoke portions radiating from said wheel portion; two oppositely flaring rim rings; means for securing said rim rings on the opposite faces of said spokes in spaced-apart relation to form a V-belt receiving groove; and a flexible de-icer band in the bottom of said groove.

2. A V-belt sheave for vehicular use as described in claim 1 in which the rim rings are provided with spaced-apart ears extending axially inward from the rings on the opposite sides of the spokes, and having clamping bolts clamping the ears of the opposite rings to the opposite sides of the spokes.

3. A V-belt sheave for vehicular use comprising: a wheel portion; means for concentrically mounting said wheel portion between dual wheels of a vehicle; two annular spaced-apart rim members mounted on and concentrically surrounding said wheel portion and forming a V-belt groove thereabout, there being longitudinally extending passages in the bottom of said belt groove; and an endless, tensioned, elastic band positioned in the bottom of said ring groove, the tension in said band causing it to form straight, tangentially extending portions extending between the extremities of each of said passages.

4. A V-belt sheave for vehicular use comprising: a wheel portion; means for concentrically mounting said wheel portion between dual wheels of a vehicle; uniformly spaced-apart spokes extending from said wheel portion; two rim rings mounted on the extremities of said spokes, said rim rings flaring from each other to form a peripheral V-belt groove, there being a passage in the bottom of said groove communicating between each pair of spokes; and a flexible de-icer band in the bottom of said groove.

5. A V-belt sheave as described in claim 4 in which the rim rings are mounted on opposite faces of said spokes so as to be maintained in parallel spaced relation by said spokes.

6. A V-belt sheave as described in claim 5 having bolt ears formed on said rim rings, said bolt ears corresponding in number and spacing to said spokes, and bolts extending through said ears and through said spokes and securing the former to the latter.

7. A V-belt sheave for vehicular use comprising: a wheel portion; means for concentrically mounting said wheel portion between dual wheels of a vehicle; uniformly spaced-apart spokes extending from said wheel portion; two rim rings mounted on the extermities of said spokes, said rim rings flaring from each other to form a peripheral V-belt groove, there being a passage in the bottom of said groove communicating between each pair of spokes, there being a belt-installing notch extending radially inward from the periphery of one of said rim rings through which a V-belt may be introduced into the peripheral V-belt groove; and a flexible de-icer band in the bottom of said groove.

References Cited in the file of this patent

UNITED STATES PATENTS

| | | |
|---|---|---|
| 286,323 | Martindale | Oct. 9, 1883 |
| 649,147 | Towse | May 8, 1900 |
| 1,121,483 | Crawford | Dec. 15, 1914 |
| 1,615,170 | Evans | Jan. 18, 1927 |